United States Patent
Yon et al.

(10) Patent No.: US 12,546,658 B2
(45) Date of Patent: Feb. 10, 2026

(54) METHOD FOR MANUFACTURING A DETECTION DEVICE COMPRISING AN ENCAPSULATION STRUCTURE COMPRISING A THIN OPAQUE LAYER RESTING ON A MINERAL PERIPHERAL WALL

(71) Applicant: COMMISSARIAT À L'ÉNERGIE ATOMIQUE ET AUX ÉNERGIES ALTERNATIVES, Paris (FR)

(72) Inventors: Jean-Jacques Yon, Grenoble (FR); Geoffroy Dumont, Grenoble (FR); Thomas Perrillat-Bottonet, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 412 days.

(21) Appl. No.: 18/260,173

(22) PCT Filed: Dec. 30, 2021

(86) PCT No.: PCT/EP2021/087868
§ 371 (c)(1),
(2) Date: Jun. 30, 2023

(87) PCT Pub. No.: WO2022/144427
PCT Pub. Date: Jul. 7, 2022

(65) Prior Publication Data
US 2024/0295439 A1    Sep. 5, 2024

(30) Foreign Application Priority Data

Jan. 4, 2021    (FR) ...................................... 2100043

(51) Int. Cl.
*G01J 5/04* (2006.01)
*G01J 5/02* (2022.01)
(Continued)

(52) U.S. Cl.
CPC ............... *G01J 5/045* (2013.01); *G01J 5/024* (2013.01); *G01J 5/064* (2022.01); *G01J 5/70* (2022.01)

(58) Field of Classification Search
CPC .. G01J 5/045; G01J 5/024; G01J 5/064; G01J 5/70; G01J 5/0225; G01J 5/06
See application file for complete search history.

(56) References Cited

U.S. PATENT DOCUMENTS 9,911,785 B2    3/2018 Yon
11,346,722 B2 *  5/2022 Becker ................. H10F 39/011
(Continued)

FOREIGN PATENT DOCUMENTS

DE    10058864 A1    6/2002
EP    2447688 A1    5/2012
(Continued)

OTHER PUBLICATIONS

International Search Report for PCT/EP2021/087868 dated Apr. 4, 2022.

*Primary Examiner* — David J Makiya
*Assistant Examiner* — Gisselle M Gutierrez
(74) *Attorney, Agent, or Firm* — McDonald Hopkins LLC

(57) ABSTRACT

A method for manufacturing a detection device includes steps of: producing thermal detectors distributed in a detection array and a compensation array using mineral sacrificial layers; producing an encapsulation structure comprising a thin opaque layer extending above the compensation array; partially removing the mineral sacrificial layers by chemical etching, so as to release the detection array and the com-
(Continued)

pensation array, and to obtain the peripheral wall then formed of a non-etched portion of the mineral sacrificial layers and surrounding the compensation array, the thin opaque layer then being suspended above the compensation array and resting on the peripheral wall.

15 Claims, 7 Drawing Sheets

(51) Int. Cl.
  *G01J 5/06* (2022.01)
  *G01J 5/70* (2022.01)

(56) References Cited

U.S. PATENT DOCUMENTS

| | | | |
|---|---|---|---|
| 11,575,063 B2* | 2/2023 | Becker | H10F 77/60 |
| 12,199,211 B2* | 1/2025 | Dumont | H10F 39/011 |
| 12,203,811 B2* | 1/2025 | Dumont | G01J 5/068 |
| 2009/0146059 A1 | 6/2009 | Nakaki | |
| 2013/0240738 A1 | 9/2013 | Yon et al. | |
| 2017/0317137 A1 | 11/2017 | Yon | |
| 2018/0321087 A1 | 11/2018 | Leduc et al. | |
| 2021/0181025 A1* | 6/2021 | Becker | H10F 39/011 |
| 2021/0184069 A1* | 6/2021 | Becker | H10F 77/50 |
| 2022/0416113 A1* | 12/2022 | Dumont | G01J 5/045 |
| 2023/0213389 A1* | 7/2023 | Dumont | G01J 5/045 374/121 |
| 2024/0295439 A1* | 9/2024 | Yon | G01J 5/024 |

FOREIGN PATENT DOCUMENTS

| | | | | |
|---|---|---|---|---|
| EP | 3239670 A1 | 11/2017 | | |
| EP | 3399290 A1 | 11/2018 | | |
| FR | 3118663 B1 * | 7/2024 | | G01J 5/06 |
| WO | 2012/056124 A1 | 5/2012 | | |
| WO | 2014/100648 A1 | 6/2014 | | |

* cited by examiner

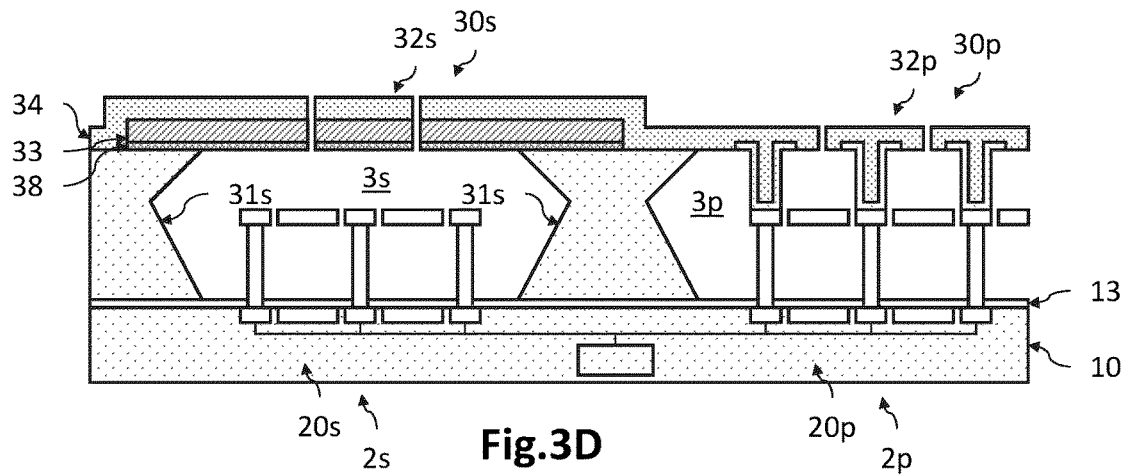
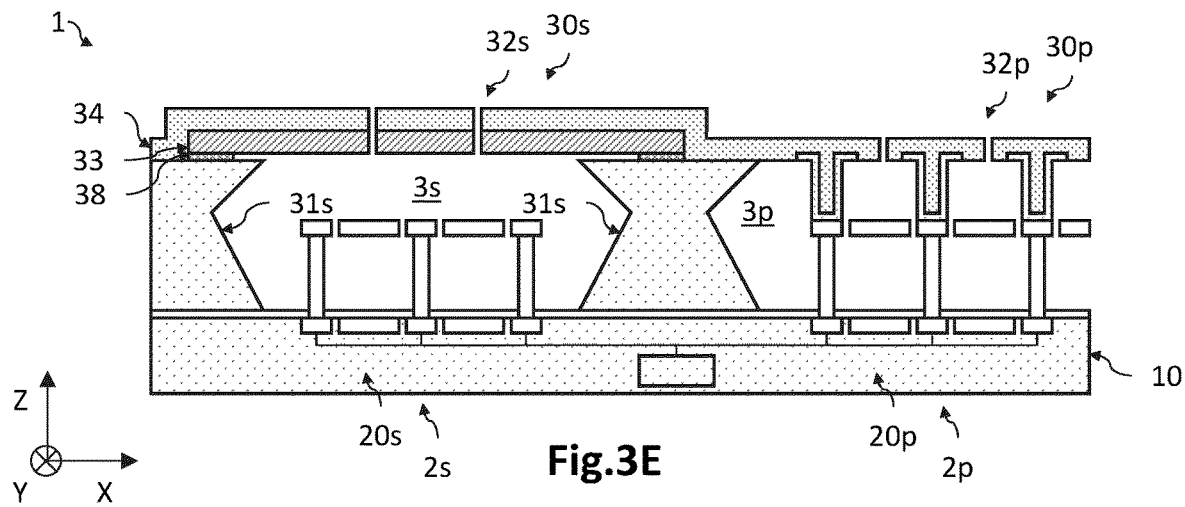
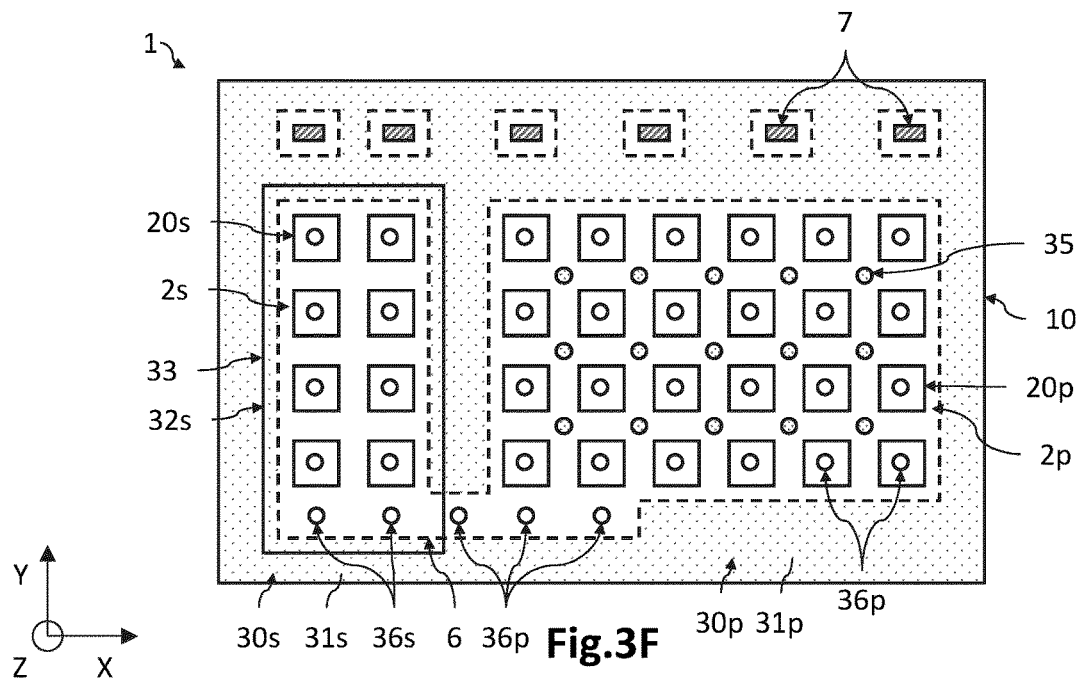

METHOD FOR MANUFACTURING A DETECTION DEVICE COMPRISING AN ENCAPSULATION STRUCTURE COMPRISING A THIN OPAQUE LAYER RESTING ON A MINERAL PERIPHERAL WALL

CROSS-REFERENCE TO RELATED APPLICATIONS

This is the National Stage application of PCT international application PCT/EP2021/087868, filed on Dec. 30, 2021, which claims the priority of French Patent Application No. 2100043, filed Jan. 4, 2021, both of which are incorporated herein by reference in their entireties.

TECHNICAL FIELD

The field of the invention is that of devices for detecting electromagnetic radiation, in particular infrared or terahertz, comprising an encapsulation structure wherein an array of compensation thermal detectors is located, the encapsulation structure comprising an upper thin layer opaque to the radiation to be detected. The invention particularly applies to the field of infrared or terahertz imaging, thermography or even gas detection.

PRIOR ART

A device for detecting electromagnetic radiation may comprise an array of sensitive pixels each containing a thermal detector. The thermal detectors are made from a reading substrate containing a readout integrated circuit (ROIC). The thermal detectors may be of the type with absorbent membrane thermally insulated from the reading substrate. The absorbent membrane comprises an absorber of the electromagnetic radiation to be detected associated with a thermometric transducer an electrical property of which varies in intensity depending on its heating.

The temperature of the thermometric transducer however being largely dependent on its environment, the absorbent membrane is usually thermally insulated from the substrate and from the reading circuit, which is disposed in the substrate. Thus, the absorbent membrane is generally suspended above the substrate by anchoring pillars, and is thermally insulated therefrom by holding arms and thermal insulation. These anchoring pillars and insulating arms also have an electrical function by ensuring the electrical connection of the suspended membrane to a reading circuit disposed in the substrate.

However, during the reading of an electrical signal by the thermal detector during the absorption of the electromagnetic radiation, the useful part of the electrical signal measured, which is associated with the heating of the thermometric transducer (induced by the absorption of the electromagnetic radiation to be detected), remains low in relation to the intensity of the electrical signal measured. In addition, the detection device usually comprises so-called compensation thermal detectors intended to measure the non-useful portion of the electrical signal, also called common mode, associated with the environment of the thermal detector, which is subsequently subtracted from the response signal to deduce therefrom the useful portion.

The detection device, in particular when it operates in rolling shutter mode, may then comprise an array of sensitive pixels, and an array of compensation pixels usually smaller than the array of sensitive pixels, and a CTIA-type integrator disposed at the foot of each column of pixels. During operation, the array of sensitive pixels is read line by line. The integrator receives the response signal $I_d$ from the thermal detector and subtracts therefrom the common mode electrical signal $I_c$ measured by the corresponding compensation detector. Thus, the non-useful portion contained in the response signal $I_d$ is compensated by the common mode $I_c$. Thus, the useful portion $I_d$-$I_c$ associated with the absorption of the electromagnetic radiation to be detected is obtained, without it being necessary to specifically regulate the temperature of the substrate.

The document WO2012/056124A1 describes an example of detection device comprising an array of sensitive pixels and an array of compensation pixels. Each pixel comprises a thermal detector with absorbent membrane suspended above the reading substrate. The thermal detectors are produced on and through a first polyimide sacrificial layer, and are covered by a second sacrificial layer. A compensation structure forms a cavity wherein the array of compensation pixels is located. It comprises a thin opaque layer making it possible to screen the compensation pixels, that is to say to not transmit the electromagnetic radiation to be detected. For this purpose, the thin opaque layer is produced by conformal deposition so as to continuously cover the upper face and the sidewalls of the two sacrificial layers. In addition, the thin opaque layer comprises an upper wall extending above the compensation pixels and a peripheral wall, which rest on the reading substrate, extending around the latter.

However, there is a need to have a method for manufacturing such a detection device making it possible to improve the mechanical strength of the encapsulation structure of the compensation array, without degrading the quality of the optical screening, and without making the production steps more complicated.

Moreover, the document US2009/0146059A1 is known that describes a detection device comprising thermal detectors and compensation elements. However, the latter are structurally different from the thermal detectors that ensure the detection of the electromagnetic radiation of interest, which may impair the quality of the compensation carried out.

DISCLOSURE OF THE INVENTION

The object of the invention is to remedy at least partly the drawbacks of the prior art. For this purpose, the object of the invention is a method for manufacturing a device for detecting electromagnetic radiation, comprising the following steps of:

producing, on and through a first sacrificial layer resting on a reading substrate, a detection array formed of thermal detectors intended to detect the electromagnetic radiation, and at least one so-called compensation array formed of thermal detectors intended not to detect the electromagnetic radiation, a second sacrificial layer covering the thermal detectors and the first sacrificial layer; the thermal detectors (20s) of the compensation array (2s) being adapted to detect the electromagnetic radiation and structurally identical to the thermal detectors (20p) of the detection array (2p);

producing a so-called secondary encapsulation structure delimiting a secondary cavity wherein the compensation array is located, and comprising a peripheral wall as well as an opaque upper wall resting on the peripheral wall and formed of at least one thin opaque layer.

According to the invention, the first and second sacrificial layers are made of a mineral material. In addition, the step of producing the secondary encapsulation structure comprises the following steps of:

producing the thin opaque layer so that it extends in a continuously planar manner only along an upper surface of the second mineral sacrificial layer;

producing, in the thin opaque layer, vents disposed facing the compensation array;

partially removing the first and second mineral sacrificial layers through vents, by chemical etching, so as to release the detection array and the compensation array, and to obtain the peripheral wall then formed of a non-etched portion of the mineral sacrificial layers and surrounding the compensation array, the thin opaque layer then being suspended above the compensation array and resting on the peripheral wall.

Some preferred yet non-limiting aspects of this method are as follows.

The first and second sacrificial layers may be made of the same mineral material based on a silicon nitride or oxide.

The thermal detectors of the detection array like the thermal detectors of the compensation array each comprise an absorbent membrane capable of absorbing the electromagnetic radiation to be detected and may comprise a thermometric transducer, suspended above the reading substrate by anchoring pillars and holding arms and thermal insulation.

The thermal detectors of the detection array and/or the thermal detectors of the compensation array may each comprise a reflective layer, which rests on the reading substrate, below each absorbent membrane.

The opaque upper wall may comprise an interferential stack absorbent to the electromagnetic radiation to be detected The thin opaque layer may be a layer reflective or absorbent to the electromagnetic radiation to be detected.

The thin opaque layer may have a uniform thickness.

The opaque upper wall may further comprise at least one thin reinforcement layer covering the thin opaque layer, and may have an edge protruding in relation to the peripheral wall in a plane parallel to the reading substrate, the protruding edge comprising the thin opaque layer and/or the thin reinforcement layer.

The secondary cavity may have a length and a width in a plane parallel to the reading substrate, the width being less than or equal to 200 µm. The width is less than the length.

The opaque upper wall may not comprise reinforcement pillars, made in one piece and of the same material with a thin layer of the opaque upper wall, located in the secondary cavity and coming to rest on the reading substrate.

The mineral sacrificial layers may be made of a material absorbent to the electromagnetic radiation to be detected.

The thin opaque layer may be made of a gettering material.

The manufacturing method may comprise the following steps of:

before the step of partial removal, producing the opaque upper wall formed of a stack comprising a thin protective layer made of inert amorphous carbon with an etching agent used during the step of partial removal and located in contact with the second mineral sacrificial layer, the thin opaque layer extending only over and in contact with the thin protective layer, so that, during the step of partial removal, the thin opaque layer is protected by the thin protective layer;

after the step of partial removal, removing at least one portion of the thin protective layer by chemical etching, so as to free an inner face of the thin opaque layer.

The manufacturing method may comprise a step of producing a main encapsulation structure delimiting a main cavity wherein the detection array is located, and comprising a main upper wall comprising a thin encapsulation layer resting on a main peripheral wall, by the following steps of:

depositing the thin encapsulation layer on the second mineral sacrificial layer, extending above the detection array and the compensation array;

producing, in the thin encapsulation layer, main vents disposed facing the detection array;

the partial removal of the first and second mineral sacrificial layers being carried out so as to form the main peripheral wall then formed of a non-etched portion of the mineral sacrificial layers and surrounding the detection array, the thin encapsulation layer then being suspended above the detection array and resting on the main peripheral wall.

The manufacturing method may comprise a step of producing a communication chamber connecting the secondary cavity and the main cavity, the communication chamber being delimited laterally by a non-etched portion of the first and second mineral sacrificial layers.

The manufacturing method may comprise a step of producing reinforcement pillars of the thin encapsulation layer, resting on the reading substrate, preferably by means of anchoring pillars of the thermal detectors of the detection array.

The chemical etching in an acid medium may be carried out with hydrofluoric acid in the vapour phase, and the first and second mineral sacrificial layers may be made of a mineral material based on silicon, and preferably a silicon oxide. It may be carried out with the aid of a fluorocarbon etching agent in the gaseous phase, in particular when the mineral sacrificial layers are made based on a silicon nitride.

The invention also relates to a device for detecting electromagnetic radiation, comprising:

a reading substrate;

a detection array formed of thermal detectors intended to detect the electromagnetic radiation;

at least one so-called compensation array formed of thermal detectors intended not to detect the electromagnetic radiation, adapted to detect the electromagnetic radiation, and structurally identical to the thermal detectors ($20p$) of the detection array ($2p$);

a so-called secondary encapsulation structure delimiting a secondary cavity wherein the compensation array is located, and comprising a peripheral wall as well as an opaque upper wall resting on the peripheral wall and formed of at least one thin opaque layer;

The thin opaque layer extending in a continuously planar manner, and the peripheral wall being made of a mineral material.

BRIEF DESCRIPTION OF THE DRAWINGS

Other aspects, aims, advantages and features of the invention will appear better upon reading the following detailed description of preferred embodiments thereof, given as a non-limiting example, and made with reference to the appended drawings, wherein:

FIGS. 3A to 3F are schematic and partial views illustrating various steps of a method for manufacturing a detection device according to an alternative embodiment, wherein the thin opaque layer is made of a material with a gettering effect;

DETAILED DESCRIPTION OF PARTICULAR EMBODIMENTS

Figure 1A:
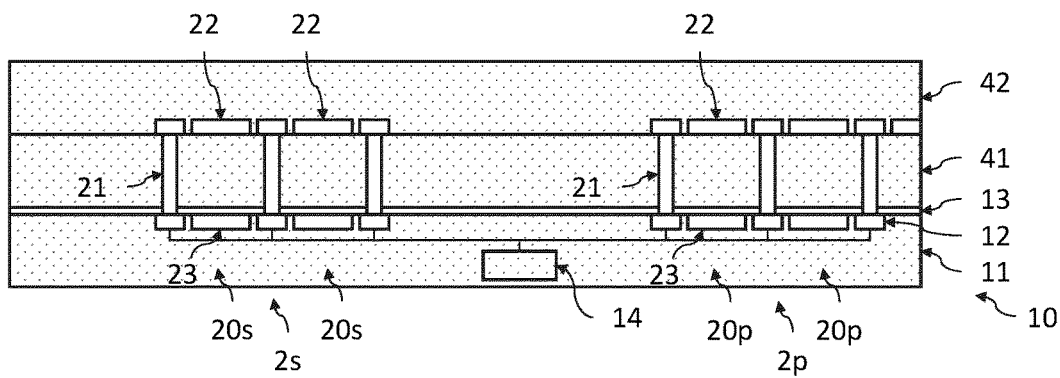
FIGS. 1A to 1F are schematic and partial views illustrating various steps of a method for manufacturing a detection device according to one embodiment.

In the figures and in the remainder of the description, the same references represent identical or similar elements. In addition, the various elements are not represented to scale so as to promote clarity of the figures. Moreover, the different embodiments and variants are not mutually exclusive and could be combined together. Unless indicated otherwise, the terms "substantially", "approximately", "in the order of" mean within a 10% margin, and preferably within a 5% margin. Moreover, the terms "between . . . and . . . " and equivalents mean that the bounds are included, unless stated otherwise.

The invention generally relates to a method for manufacturing a device for detecting infrared or terahertz electromagnetic radiation.

This detection device comprises a plurality of thermal detectors, which are distributed so as to form at least one so-called sensitive array or detection array, of thermal detectors intended to detect the electromagnetic radiation, and at least one so-called compensation array of thermal detectors intended not to detect the electromagnetic radiation.

The manufacturing method comprises a step of producing the array of thermal detectors by means of so-called mineral sacrificial layers, made of an inorganic or mineral material, these sacrificial layers being intended to form a peripheral wall of an encapsulation structure. Here, this concerns a dielectric material based on silicon also making it possible to produce an inter-metal dielectric layer of the reading circuit, that is to say an electrically insulating material, with for example a dielectric constant, or relative permittivity, less than or equal to 3.9, thus limiting the parasitic capacitance between the interconnections. This mineral material does not comprise carbon chains, and it may be based on a silicon oxide, for example be a silicon oxide $SiO_x$, optionally organosilicon such as SiOC, SiOCH, or a material of the fluorinated glass type such as SiOF. It may also be based on silicon nitride, for example be a silicon nitride $Si_xN_y$. Preferably, it concerns a silicon oxide $SiO_x$.

The manufacturing method also comprises a step of partially removing the mineral sacrificial layers by chemical etching, optionally chemical etching in an acid medium, for example with hydrofluoric acid in the vapour phase (vapour HF) in particular when the mineral material is based on silicon oxide. In the case of a mineral material based on a silicon nitride, the partial etching may be carried out with the aid of a fluorocarbon chemistry in the gaseous phase. In any case, other etching agents may be used depending on the nature of the mineral material used.

The compensation array is located in a cavity, preferably sealed, formed by an encapsulation structure that extends above and around compensation thermal detectors. The encapsulation structure comprises at least:

one mineral peripheral wall that extends around the compensation array and laterally delimits the cavity. As explained later on, the mineral peripheral wall is formed of a non-etched portion of the mineral sacrificial layers;

one opaque upper wall, which extends above the compensation array and vertically delimits the cavity. This opaque upper wall comprises at least one thin opaque layer made of a material opaque to the electromagnetic radiation to be detected, that is to say the transmission of which is less than or equal to 5%, or even less than or equal to 1%.

Thin layer means a layer formed by microelectronic material deposition techniques, the thickness of which is preferably less than or equal to 10 µm. Moreover, a thin layer is called transparent when it has a transmission rate greater than or equal to 50%, preferably 75%, or even 90% for a central wavelength of the spectral range of the electromagnetic radiation to be detected. The absorption rate of the thin layer is preferably less than or equal to 50%, preferably 25%, and more preferably 10%.

Various embodiments are subsequently illustrated, and essentially different with regard to the encapsulation structure defining the main cavity wherein the detection array is located. Thus, it may concern an encapsulation structure made entirely by depositing transparent thin layers on and through mineral sacrificial layers; or an encapsulation structure at least one portion of which is attached and assembled to the reading substrate.

FIGS. 1A to 1F illustrate, schematically and partially, various steps of a method for manufacturing a detection device 1 according to one embodiment, wherein the encapsulation structures 30s, 30p of the compensation array 2s and of the detection array 2p are made by depositing thin layers on and through mineral sacrificial layers 41, 42. In the interest of clarity, only one portion of the detection array 2p and of the corresponding encapsulation structure 30p are shown in the figures. In this example, the detection device 1 comprises a compensation array 2s located in a secondary cavity 3s, but it may alternatively comprise a plurality of compensation arrays each located in a dedicated secondary cavity 3s (see FIG. 2).

Here and for the remainder of the description, a direct three-dimensional XYZ reference is defined, where the XY plane is substantially parallel to the reading substrate 10, the Z axis being oriented in a direction substantially orthogonal to the plane of the reading substrate 10 in the direction of the thermal detectors 20p, 20s. The terms "vertical" and "vertically" are understood as relating to an orientation substantially parallel to the Z axis, and the terms "horizontal" and "horizontally" as relating to an orientation substantially parallel to the XY plane. Moreover, the terms "lower" and "upper" are understood as relating to an increasing positioning when moving away from the reading substrate 10 in the +Z direction.

The detection device 1 comprises:

a so-called sensitive array 2p of thermal detectors 20p intended to receive and detect the electromagnetic radiation of interest, the detection array 2p preferably being located in a main cavity 3p defined by a main encapsulation structure 30p;

at least one so-called compensation array 2s of thermal detectors 20s intended not to receive the electromagnetic radiation of interest, the compensation array 2s being located in a secondary cavity 3s defined by a secondary encapsulation structure 30s. This secondary encapsulation structure 30s comprises an opaque upper wall 32s resting on a mineral peripheral wall 31s and comprising at least one thin opaque layer 33.

By way of example, the thermal detectors 20p here are adapted to detect infrared radiation in the Long Wavelength Infrared (LWIR) range, the wavelength of which is between approximately 8 µm and 14 µm. The thermal detectors 20p and 20s are connected to a reading circuit 14 located in the substrate 10 (then called reading substrate). The sensitive thermal detectors 20p thus form sensitive pixels preferably arranged periodically, and may have a lateral dimension in the plane of the reading substrate 10, in the order of a few tens of microns, for example equal to approximately 10 µm or even less.

The compensation thermal detectors 20s are structurally similar or identical to the sensitive thermal detectors 20p in the meaning where they comprise a membrane suspended 22 by holding arms (not shown) and anchoring pillars 21. The suspended membrane 22 may also comprise a thermometric transducer. They may then provide the reading circuit 14 with an electrical signal representative of heating by Joule effect during the reading. Moreover, it should be noted that some compensation thermal detectors may also provide the reading circuit 14 with an electrical signal representative, furthermore, of the temperature of the reading substrate 10 (common mode). For this purpose, these thermal detectors are thermalised with the reading substrate 10 insofar as the holding arms do not ensure the thermal insulation of the absorbent membrane 22 in relation to the reading substrate 10.

With reference to FIG. 1A, the detection array 2p and the compensation array 2s are produced, from the reading substrate 10, on and through a first mineral sacrificial layer 41. The reading substrate 10 is made based on silicon, and is formed of a support substrate 11 containing the reading circuit 14 adapted to control and read the thermal detectors 20p, 20s. The reading circuit 14 here is in the form of a CMOS integrated circuit. It comprises inter alia portions of conductive lines separated from one another by inter-metal insulating layers made of a dielectric material, for example a mineral material based on silicon such as a silicon oxide $SiO_x$, a silicon nitride $SiN_x$, inter alia. Conductive portions 12 are flush with the surface of the support substrate 11, and ensure the electrical connection of the anchoring pillars 21 of the thermal detectors 20p, 20s with the reading circuit 14. In addition, one or more portions or connection studs 7 (see FIG. 1F) are flush with the surface of the support substrate 11, and make it possible to connect the reading circuit 14 to an external electronic device (not shown). In this example, the reading circuit 14 is adapted to read an electrical signal emitted by the compensation thermal detectors 20s, which is representative of the heating by Joule effect during the reading (and optionally representative of the temperature of the reading substrate 10). Thus, by carrying out a differential reading of the sensitive thermal detector 20p and of the compensation thermal detector 20s, the parasitic component related to the heating by Joule effect (and optionally the component related to the temperature of the substrate) can be subtracted from the 'raw' electrical signal in order to only conserve the useful portion related to the detection of the electromagnetic radiation of interest.

Each sensitive thermal detector 20s, and preferably each compensation thermal detector 20p, comprises a reflective layer 23 (reflector), which rests on the reading substrate 10 and is located facing (and therefore below) each absorbent membrane 22. The reflector 23 may be formed by a portion of a conductive line of the last interconnection level, this being made of a material adapted to reflect the electromagnetic radiation to be detected, or be a layer deposited on the protective layer 13 presented hereafter. It extends facing the absorbent membrane 22 of the sensitive thermal detector 20p, and is intended to form with it a quarter-wave interferential cavity in relation to the electromagnetic radiation to be detected. Preferably, it also extends facing the absorbent membrane 22 of the compensation thermal detector 20s.

Finally, the reading substrate 10 here comprises a protective layer 13 so as to cover particularly the upper inter-metal insulating layer. This protective layer 13 here corresponds to an etching stop layer made of a substantially inert material with the chemical etching agent used subsequently to remove the various mineral sacrificial layers, for example with the HF medium in the vapour phase. This protective layer 13 thus forms a chemically inert and sealed layer, and electrically insulating to prevent any short circuit between the anchoring pillars 21. Thus, it makes it possible to prevent the underlying inter-metal insulating layers being etched during this step of removing the mineral sacrificial layers. It may be formed of an aluminium nitride or oxide, or even of aluminium trifluoride, or also of amorphous silicon not intentionally doped.

The thermal detectors 20p, 20s are subsequently produced on the reading substrate 10. These production steps are identical or similar to those described particularly in the document EP3239670A1. The sensitive thermal detectors 20p and the compensation thermal detectors 20s here advantageously have a similar structure. Here, they are microbolometers each comprising an absorbent membrane 22, i.e. capable of absorbing the electromagnetic radiation to be detected, suspended above the reading substrate 10 by anchoring pillars 21 and holding arms (not shown). The holding arms also ensure the thermal insulation of the absorbent membranes in relation to the reading substrate 10. Of course, this is the case of sensitive thermal detectors 20p, but also of compensation thermal detectors 20s that thus provide an electrical signal representative of heating by Joule effect during the reading.

The production of absorbent membranes 22 is conventionally carried out by surface micro-machining techniques consisting in producing the anchoring pillars 21 through a first mineral sacrificial layer 41, and the holding arms as well as the absorbent membranes 22 on the upper face of the mineral sacrificial layer 41. Each absorbent membrane 22 further comprises a thermometric transducer, for example a thermistor material, connected to the reading circuit 14 by electrical connections provided in the thermal insulation arms and in the anchoring pillars 21.

The sensitive thermal detectors 20p are located in a main area of the surface of the reading substrate 10 intended to correspond to the main cavity 3p (detection cavity), and the compensation thermal detectors 20s are located in a secondary area of this surface intended to correspond to the secondary cavity 3s (compensation cavity). It should be noted that the detection array 2p may contain a large number of thermal detectors 20p, for example 640×480. The compensation array 2s may, by way of example, contain 4×480 thermal detectors 20s. The main area therefore has a larger surface than the secondary area.

A second mineral sacrificial layer 42 preferably of the same nature as the mineral sacrificial layer 41 is subsequently deposited. The mineral sacrificial layer 42 thus covers the mineral sacrificial layer 41 as well as the sensitive thermal detectors 20p and the compensation thermal detectors 20s. It has a substantially planar free upper face. Generally, the various mineral sacrificial layers 41, 42 may be a silicon oxide obtained from a TEOS (tetraethyl orthosilicate) compound deposited by PECVD. The mineral sacrificial layers 41, 42 may be made of the same mineral material.

Figure 1B:
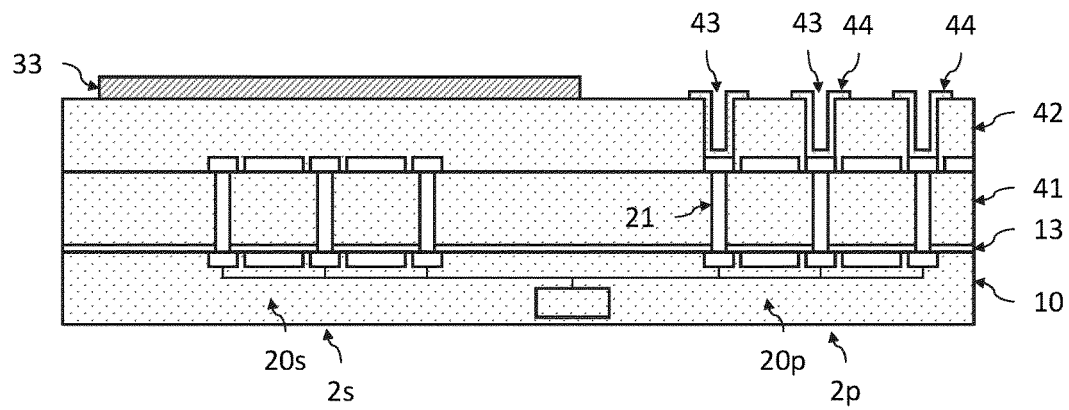

With reference to FIG. 1B, the thin opaque layer 33 intended to screen the compensation array 2s, that is to say to prevent the transmission of the electromagnetic radiation to be detected in the direction of the compensation thermal detectors 20s, is produced. The thin opaque layer 33 may be a layer reflecting or absorbing the electromagnetic radiation of interest. The thin opaque layer 33 is produced so that it extends in a continuously planar manner over an upper surface (on a portion of the upper face) of the mineral sacrificial layer 42.

In this example, a thin opaque layer 33 is deposited on and in contact with the second mineral sacrificial layer 42. Alternatively, one or more thin layers may have been deposited beforehand on the second mineral sacrificial layer 42. The thin opaque layer 33 is deposited so as to extend in a continuously planar manner above the compensation array 2s. Continuously planar means that the thin opaque layer 33 extends in a planar manner in the XY plane over its entire surface area. It is deposited so that it has a substantially constant thickness.

In the case of a reflective material, it may concern aluminium, gold, tungsten, copper or titanium, with a constant thickness for example between 100 nm and a few hundred nanometres, for example equal to approximately 300 nm. Preferably, the thickness of the thin opaque layer 33 is less than or equal to 1 µm so as not to make the manufacturing method more complicated. These materials of the thin opaque layer 33 are advantageously substantially inert (or weakly reactive) to the chemical etching implemented for partially removing the mineral sacrificial layers 41, 42. In the case where the material is weakly reactive to the etching agent used, the thickness of the material deposited will be slightly greater than the desired final thickness, to take into account a slight partial etching (thinning) during the chemical etching step.

The thin opaque layer 33 may be deposited by thin layer deposition techniques guaranteeing a uniformity of its thickness, for example by Physical Vapour Deposition (PVD), of the type by cathode sputtering of a metal target or by vacuum evaporation of a metal heated in a crucible.

Figure 4A:
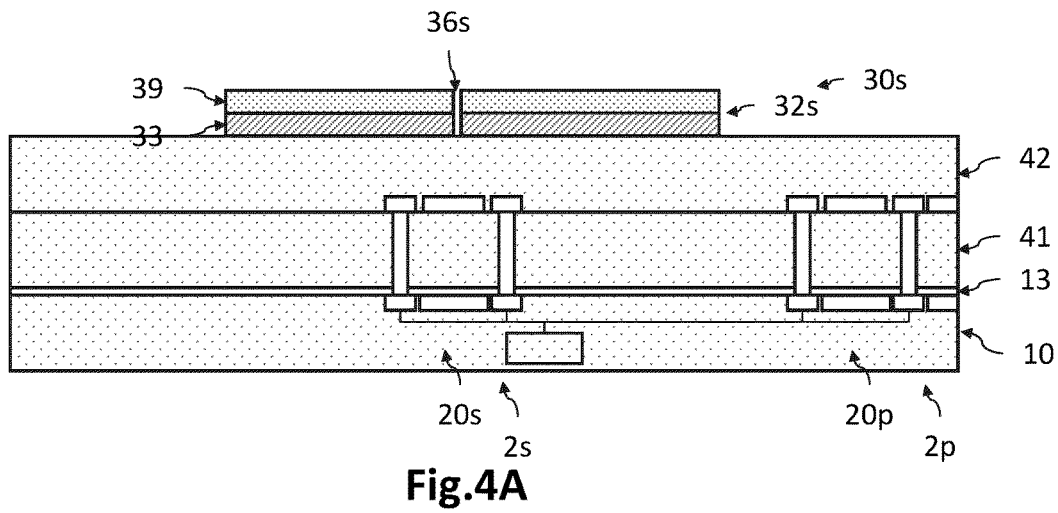
FIGS. 4A to 4D are schematic and partial views illustrating various steps of a method for manufacturing a detection device according to another embodiment, wherein the encapsulation structure of the detection array comprises a cover attached and assembled to the reading substrate.
Figure 4B:
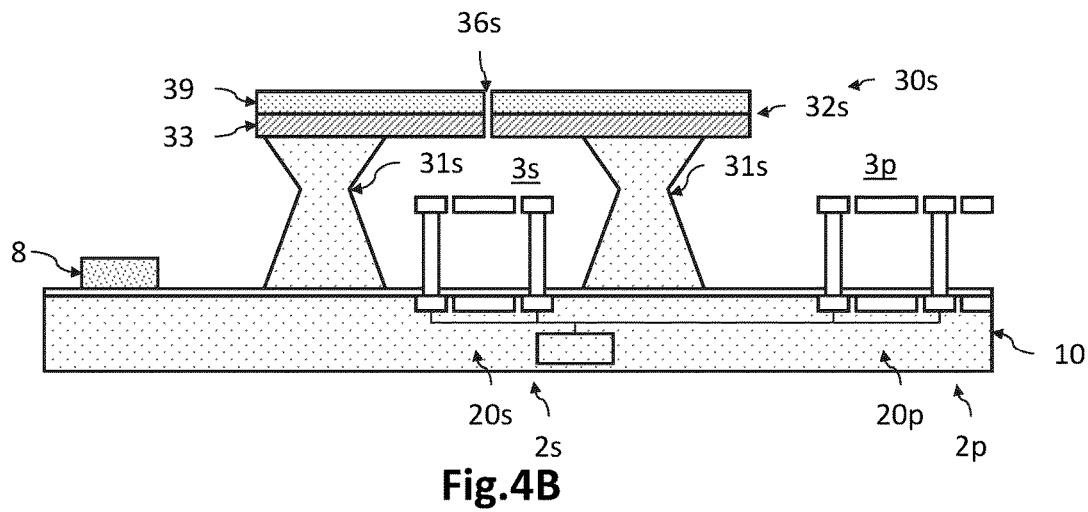

The thin opaque layer 33 is subsequently structured by lithography and localised etching, so that it does not extend above the detection array 2p. Thus, it may extend everywhere over the second mineral sacrificial layer 42 (except for above the detection array 2p—as illustrated in FIG. 4A), or may only extend above the compensation array 2s and the secondary area (as illustrated in FIG. 1F). In any case, the thin opaque layer 33 extends at least partly above the area where the mineral peripheral wall 31s of the secondary encapsulation structure 30s is located.

Preferably, notches 43 and preferably insulating portions 44 are produced here in view of producing reinforcement pillars 35 of the thin encapsulation layer 34 of the main encapsulation structure 30p. In a first step, a plurality of notches 43 are produced that extend from the upper face of the second mineral sacrificial layer 42 along the Z axis to open onto anchoring pillars 21 of the sensitive thermal detectors 20p. Afterwards, a plurality of insulating portions 44 is produced in the notches 43. These insulating portions 44 are portions of a thin layer made of an electrically insulating material. They make it possible to prevent an electrical contact between the sensitive thermal detectors 20p and the thin encapsulation layer 34 via its reinforcement pillars 35. For this purpose, an insulating thin layer is deposited on the freed surface of the anchoring pillars 21 inside the notches 43. The insulating thin layer here is advantageously locally etched above the sensitive thermal detectors 20p, so as not to disturb or reduce the transmission of the electromagnetic radiation to be detected, but it may not be etched. It may have a thickness between approximately 10 nm and 200 nm. It is made of a material inert to the chemical etching implemented during the removal of the mineral sacrificial layers, which may be selected from AlN, $Al_2O_3$, $HfO_2$.

Figure 1C:
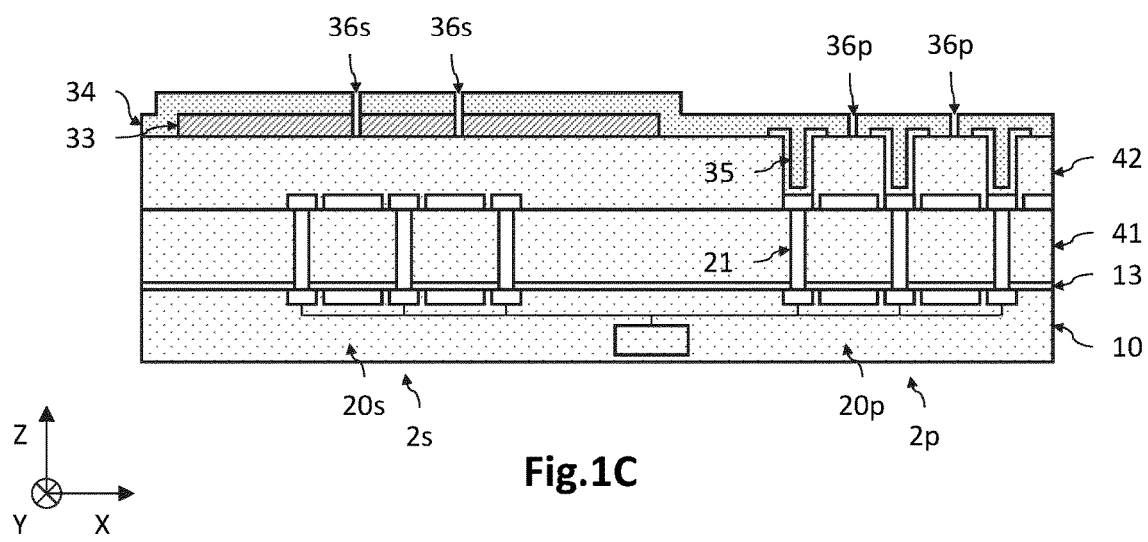

With reference to FIG. 1C, the thin encapsulation layer 34 of the main encapsulation structure 30p is produced, this thin encapsulation layer 34 being formed by an upper portion extending above the detection array 2p, and comprising reinforcement pillars 35 located in the main area, separate from one another, and resting on the reading substrate 10 via the anchoring pillars 21 of the sensitive thermal detectors 20p. For this purpose, conformal deposition is carried out of the thin encapsulation layer 34, made of a material transparent to the electromagnetic radiation of interest and inert to the chemical etching subsequently implemented, of a thickness for example between 200 nm and 2 µm, for example equal to approximately 800 nm or even less, for example amorphous silicon, amorphous geranium, an amorphous silicon-germanium, inter alia. The thin encapsulation layer 34 is deposited on the mineral sacrificial layer 42 as well as in the notches 43, for example by a Chemical Vapour Deposition (CVD) technique. Preferably, it also covers the thin opaque layer 33, thus ensuring a reinforcement of the mechanical strength of which will be the opaque upper wall 32s of the secondary encapsulation structure 30s. The thin encapsulation layer 34 thus comprises, made in one piece and of the same material(s): an upper portion, substantially planar in the XY plane, which extends above along the Z axis of the detection array 2p, and reinforcement pillars 35 that rest on the reading substrate 10, here indirectly via the anchoring pillars 21.

The thin encapsulation layer 34 here forms a quarter-wave blade in relation to the electromagnetic radiation of interest. Thus, in the case of amorphous silicon and for a spectral detection band ranging from 8 µm to 14 µm, it advantageously has a thickness of approximately 800 nm. Thus, the opaque upper wall 32s comprising the thin opaque layer 33 and the thin encapsulation layer 34 (quarter-wave blade) forms an interferential stack that, while remaining opaque to the electromagnetic radiation of interest, makes it possible to reduce the reflection of the latter by absorption in the quarter-wave blade likely to form parasitic images by the detection device 1. It should be noted here that the opaque upper wall 32s may of course comprise supplementary thin layers, thus improving the interferential properties of this stack.

More broadly, the thin opaque layer 33 may be an absorbent multilayer such as a stack (multilayer) formed of an alternation of dielectric and metal elementary thin layers, thus reducing the parasitic reflections. The thin encapsulation layer 34 may also be a stack formed of an alternation of dielectric and metal layers, which nonetheless remains transparent to the electromagnetic radiation of interest when it extends above the detection array 2p (see FIG. 1E, 3E) or which may be opaque (absorbent multilayer) when it does not extend above the detection array 2p (see FIG. 4C). In any case, one and/or the other of the multilayers of the opaque upper wall 32s may thus form an absorbent interferential stack reducing the parasitic reflections and thus improving the performances of the detection device 1. Moreover, the thin opaque layer 33 and/or the portion of the thin encapsulation layer 34 located above the compensation array 2s, and more broadly the opaque upper wall 32s, may also have lateral structures, in the XY plane, improving the opacity properties, particularly by absorption of the electromagnetic radiation of interest.

The reinforcement pillars 35 have dimensions in the XY plane in the order of those of the anchoring pillars 21. Thus, the anchoring pillars 21 may each comprise a vertical portion of dimensions in the XY plane in the order of 0.5 μm to 1 μm topped by an upper portion laterally overflowing in the order of 0.2 μm to 0.5 μm in relation to the vertical portion. The reinforcement pillars 35 here may have dimensions in the XY plane in the order of approximately 0.5 μm to 2 μm.

Subsequently, the vents 36p, 36s making it possible to produce the main 3p and secondary cavities 3s are produced. These vents 36p, 36s open onto the mineral sacrificial layer 42 and are intended to make it possible to evacuate the various mineral sacrificial layers 41, 42 out of the main cavity 3p and of the secondary cavity 3s. First vents 36p are produced through the thin encapsulation layer 34 and are intended to form the main cavity 3p. Second vents 36s are produced through the thin encapsulation layer 34 and the thin opaque layer 33, and are intended to form the secondary cavity 3s. The vents 36p, 36s are only disposed facing the main area and the secondary area, for example at a rate of one vent per thermal detector. Thus, they will make it possible to totally release the surface of the reading substrate 10 in the main and secondary areas, and to form the mineral peripheral wall 31s. In this example, the vents 36p, 36s are located perpendicular to the suspended membranes of the sensitive thermal detectors 20p and of the compensation thermal detectors 20s, but they may be disposed differently, particularly perpendicular to their anchoring pillars 21. The vents 36p, 36s may have various shapes in the XY plane, for example a circular shape of a diameter of 0.4 μm or even less. Thus, the first vents 36p do not disturb or disturb little the transmission of the electromagnetic radiation of interest, and the second vents 36s do not disturb or disturb little the screening in relation to this electromagnetic radiation of interest.

Figure 1D:
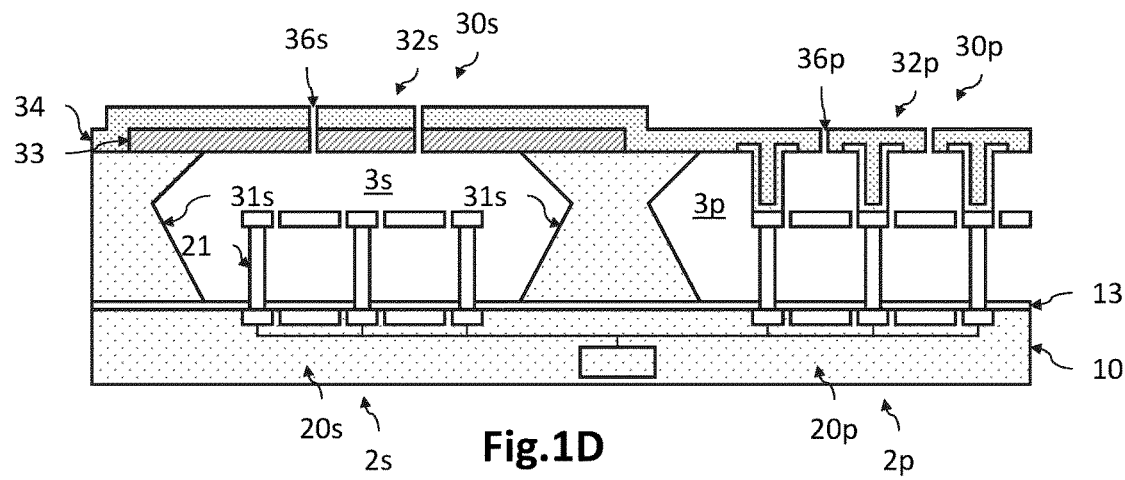

With reference to FIG. 1D, a chemical etching adapted to partially remove the mineral sacrificial layers 41, 42 is carried out. The chemical etching is an etching for example with hydrofluoric acid in the vapour phase, in particular when the mineral sacrificial layers 41, 42 are made of a silicon oxide. The products of the chemical reaction are evacuated through vents 36p, 36s.

Due to the layout of the vents 36p, 36s only located facing detection 2p and compensation arrays 2s, the etching agent entirely removes the mineral sacrificial layers 41, 42 located in these areas, but the chemical etching is carried out so that the etching agent does not etch a peripheral portion of the mineral sacrificial layers 41, 42 that extends around the compensation array 2s, and here also around the detection array 2p. Thus, the mineral peripheral wall 31s surrounds the compensation array 2s and laterally delimits the secondary cavity 3s. A mineral peripheral wall also surrounds the detection array 2p and laterally delimits the main cavity 3p (see FIG. 1F). The two mineral peripheral walls 31s, 31p are combined between the main cavity 3p and the secondary cavity 3s.

Thus, the thin opaque layer 33 and the thin encapsulation layer 34 together form an opaque upper wall 32s, suspended above the compensation array 2s, which rests on the mineral peripheral wall 31s. It contributes to delimiting, with the latter, the secondary cavity 3s. In addition, the thin encapsulation layer 34 is suspended above the detection array 2p, and contributes to delimiting the main cavity 3p. It rests on the mineral peripheral wall 31p.

Unlike the document WO2012/056124A1, the encapsulation structure 30s of the secondary cavity 3s does not comprise a peripheral wall formed of a thin layer that would extend above and around the compensation array 2s, and would come up to the reading substrate 10. Within the scope of the invention, the encapsulation structure 30s of the secondary cavity 3s comprises the mineral peripheral wall 31s and an opaque upper wall 32s that rests on the latter, and extends in a continuously planar manner above the compensation array 2s.

Figure 1E:
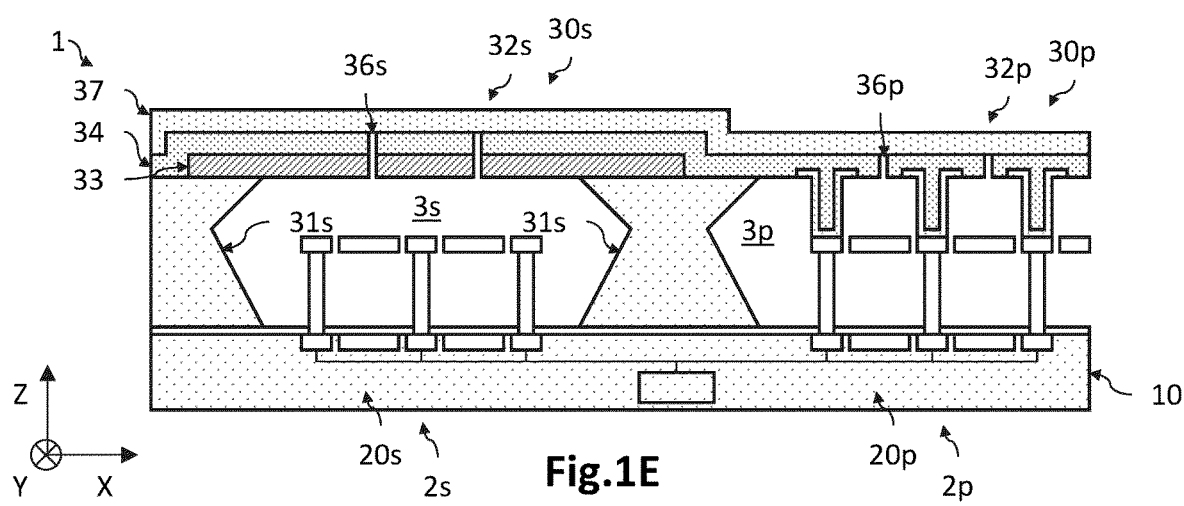
Figure 1F:
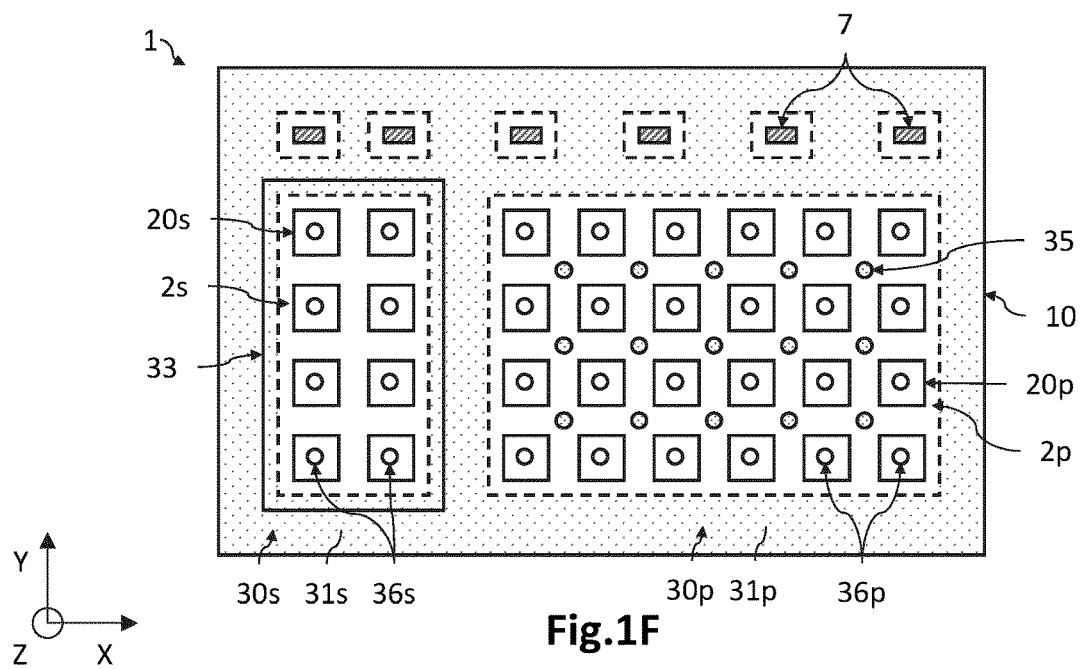

With reference to FIG. 1E, a sealing layer 37 is deposited on the thin encapsulation layer 34 with a sufficient thickness to ensure the sealing, i.e. the plugging, of the vents 36s, 36p. It extends at least facing the main cavity 3p and the secondary cavity 3s. The sealing layer 37 is transparent to the electromagnetic radiation to be detected, and may be made of germanium with a thickness of approximately 1.7 μm by a vacuum deposition for placing the thermal detectors under a vacuum. An anti-reflection layer (not shown) can also be deposited making it possible to optimise the transmission of the electromagnetic radiation through the main encapsulation structure 30p. This anti-reflection layer may be made of zinc sulphide with a thickness of approximately 1.2 μm.

FIG. 1F illustrates in top view, schematically and partially, the detection device 1. The compensation array 2s is located in the secondary cavity 3s, which is delimited laterally by the mineral peripheral wall 31s (the inner edge of which is shown by a dotted line) and vertically by the thin opaque layer 33 (solid line). The latter extends in a continuously planar manner above the compensation array 2s, with a constant thickness, and rests on the mineral peripheral wall 31s. The detection array 2p is located in the main cavity 3p, which is delimited laterally by the mineral peripheral wall 31p (dotted line) and vertically by the thin encapsulation layer 34 (not shown). Connection studs 7 here are located at the edge of the arrays of thermal detectors 20p, 20s, and make it possible to connect the reading circuit 14 to an external electric circuit (not shown). They are accessible from the outside by openings produced in non-etched portions of the mineral sacrificial layers (through layers 37, 34, 42 then 41). It should be noted that the secondary cavity 3s has a lateral dimension smaller than the dimensions of the main cavity 3p. Thus, it may be less than or equal to 200 μm. This width is defined so that the secondary encapsulation structure 30s does not need reinforcement pillars 35, unlike here of the main encapsulation structure 30p, which would be made in one piece and of the same material with a thin layer (here the thin layer 34) of the opaque upper wall 32s.

Thus, a secondary sealed cavity 3s is obtained, preferably placed in a vacuum or a reduced pressure, wherein the compensation thermal detectors 20s are housed. The secondary encapsulation structure 30s therefore comprises an opaque upper wall 32s here formed of the thin opaque layer 33, of the thin encapsulation layer 34, and of the sealing thin layer 37, this opaque upper wall 32s resting on the mineral peripheral wall 31s.

Thus, the secondary encapsulation structure 30s does not comprise any support structure for the opaque upper wall 32s of the reading substrate 10 other than the mineral peripheral wall 31s, which is from mineral sacrificial layers 41, 42 necessary for producing the thermal detectors 20p, 20s. Therefore, it does not comprise a thin layer peripheral wall, produced through mineral sacrificial layers 41, 42, which would come to rest directly on the reading substrate 10, as in the document WO2012/056124A1. In addition, the mineral peripheral wall 31s is not reflective, which makes it possible to prevent the parasitic light from being reflected towards the sensitive thermal detectors 20p.

Apart from the fact that this makes it possible to reduce the complexity of the manufacturing method (particularly in number of production steps), carrying out localised etching of the mineral sacrificial layers 41, 42 that would come to open onto the protective layer 13 of the reading substrate 10, is prevented. Thus, any risk of degradation of this protective layer 13, particularly in terms of sealing, is prevented, which eliminates the risks of degradation of the reading substrate 10 during the chemical etching with the HF vapour. In addition, the mechanical strength of the encapsulation structure 30s is improved insofar as the opaque upper wall 32s is assembled with the reading substrate 10 by a mineral peripheral wall 31s that has an interface with the reading substrate 10 of greater surface than in the case of a thin layer peripheral wall.

In addition, the absence of reinforcement pillars 35 in the secondary cavity 3s makes it possible to prevent a variation in the topology of the thin opaque layer 33 in the XY plane, or even a variation in thickness. Such variations may result in a degradation of the optical property of opacity of the thin opaque layer 33. In addition, such reinforcement pillars would extend through openings made in the thin opaque layer 33; these openings would degrade the screening of the compensation array 2s. In addition, due to the absence of reinforcement pillars 35 in the secondary cavity 3s, the thin opaque layer 33 may remain continuously planar and of constant thickness, thus preserving the good uniformity of its optical property of opacity.

Moreover, the fact of producing the thin opaque layer 33 by PVD opens a wider selection of possible materials, particularly metal, than in the case where the thin opaque layer 33 forms a thin layer peripheral wall, as in WO2012/056124A1. Indeed, in this case, it would be necessary to use specific deposition techniques, such as for example Chemical Vapour Deposition (CVD), which limits the selection of possible materials. Moreover, a wider selection of possible materials makes it possible to select an opaque material having a supplementary function, such as a gettering function, as described later on with reference to FIG. 3A to 3F.

Moreover, the thin opaque layer 33, by resting on the mineral peripheral wall 31s, may laterally overflow in relation to the compensation array 2s, which makes it possible to obtain a good screen efficiency. The screening efficiency is all the more important because the material of the mineral peripheral wall 31s may contribute to laterally screening the electromagnetic radiation of interest. Indeed, by way of example, a silicon oxide has a high absorption in the spectral band between 8 and 14 μm.

Finally, the opaque upper wall 32s is described in this example for illustrative purposes. Of course, other configurations are possible. Thus, the opaque upper wall 32s may comprise other thin layers, located under or over the thin opaque layer 33. Moreover, the arrangement of the thin layers in the opaque upper wall 32s may be selected so as to take into account differences in mechanical stresses in each of the thin layers.

Figure 2:
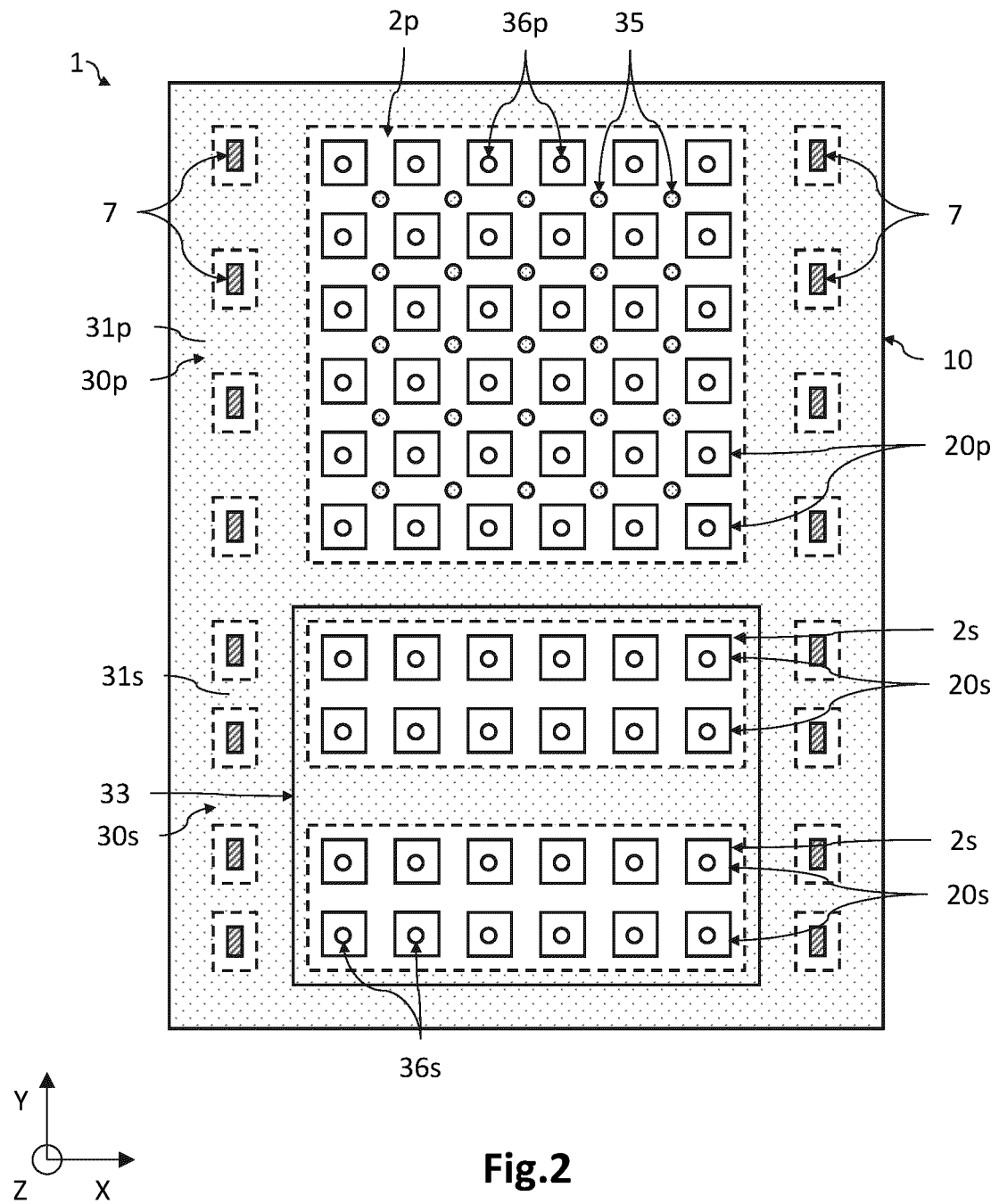
FIG. 2 is a schematic and partial, top view of a detection device according to an alternative embodiment illustrated in FIG. 1F, wherein it comprises a plurality of secondary cavities.

FIG. 2 is a schematic and partial, top view of a detection device 1 according to a variant of that illustrated in FIG. 1F. In this example, the detection device 1 is different from that described in FIG. 1F essentially in that it comprises a plurality of secondary cavities, here two, which each house a compensation array 2s. The two secondary cavities are adjacent and are separated by the same mineral peripheral wall 31s. The thin opaque layer 33 here extends continuously above the two compensation arrays 2s. Therefore, it rests on the mineral peripheral wall 31s located between the two secondary cavities. Alternatively, the secondary encapsulation structures 30s may each comprise a dedicated thin opaque layer 33. In any case, it is advantageous to provide a plurality of secondary cavities when the required number of compensation thermal detectors 20s does not make it possible to house them all in the same secondary cavity without having to produce reinforcement pillars 35 similar to those of the main cavity. In other words, it is advantageous to house the compensation thermal detectors 20s in a plurality of secondary cavities of a significantly reduced lateral dimension to prevent having to produce reinforcement pillars 35, for example less than or equal to approximately 200 μm.

FIGS. 3A to 3F illustrate, schematically and partially, various steps of a manufacturing method according to an alternative embodiment illustrated in FIG. 1A to 1F. In this example, the thin opaque layer 33 is made of a material having a gettering function. Generally, a material with gettering effect is a material intended to be exposed to the atmosphere of the sealed cavity and capable of performing gas pumping by absorption and/or adsorption. This may concern the metal material reflective to the electromagnetic radiation of interest, for example titanium.

In this example, the metal material is sensitive to the etching agent used during the chemical etching used for partially removing the mineral sacrificial layers 41, 42. In addition, it is protected from this etching agent by a protective sacrificial layer 38 made of amorphous carbon.

The amorphous carbon may optionally be of the Diamond Like Carbon (DLC) type, that is to say that it has a high level of hybridation to $sp^3$ carbon. It is substantially inert in relation to the chemical etching carried out for partially removing the mineral sacrificial layers 41, 42, that is to say it reacts little or not at all with the chemical etching agent. In addition, at the end of this step of partial removal, it still protects the gettering material. The protective sacrificial layer 38 is adapted to be removed by a second chemical etching such as a dry chemical etching an etching agent of which is for example oxygen contained in a plasma.

Figure 3A:
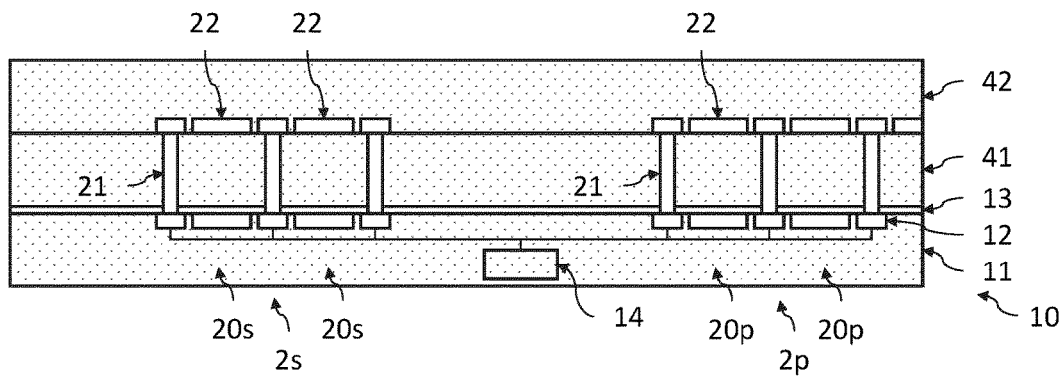

With reference to FIG. 3A, the detection array 2p and the compensation array 2s, are produced on and through the first mineral sacrificial layer 41. The second mineral sacrificial layer 42 covers the two arrays of thermal detectors 20p, 20s as well as the first mineral sacrificial layer 41. It has a planar upper face. This step is identical to that described above.

Figure 3B:
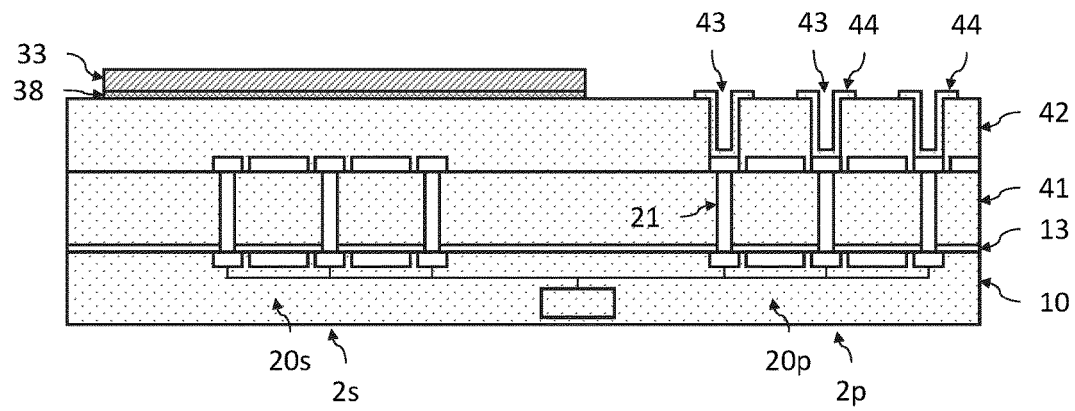

With reference to FIG. 3B, an opaque stack formed of a thin protective layer 38 and of the thin opaque layer 33 is produced. This stack extends in a continuous and planar manner above the compensation array 2s, and does not extend above the detection array 2p. It is intended to rest on the mineral peripheral wall 31s.

The thin protective layer 38 rests on and in contact with the second mineral sacrificial layer 42. It is intended to protect the thin opaque layer 33 during the chemical etching implemented during the partial removal of the mineral sacrificial layers 41, 42. It is intended to be removed during a second chemical etching, to which the thin opaque layer 33 is substantially inert, for example by dry chemical etching. It is made of amorphous carbon and has a thickness between 50 nm and 500 nm.

The thin opaque layer 33 rests on and in contact with the thin protective layer 38, and therefore is not in contact with the second mineral sacrificial layer 42. It is made of a metal material reflective to the electromagnetic radiation to be detected and has a gettering effect, for example titanium.

The notches 43 and the insulating portions 44, intended for producing the reinforcement pillars 35 of the thin encapsulation layer 34 of the main encapsulation structure 30p, are also produced in the same way as described above.

Figure 3C:
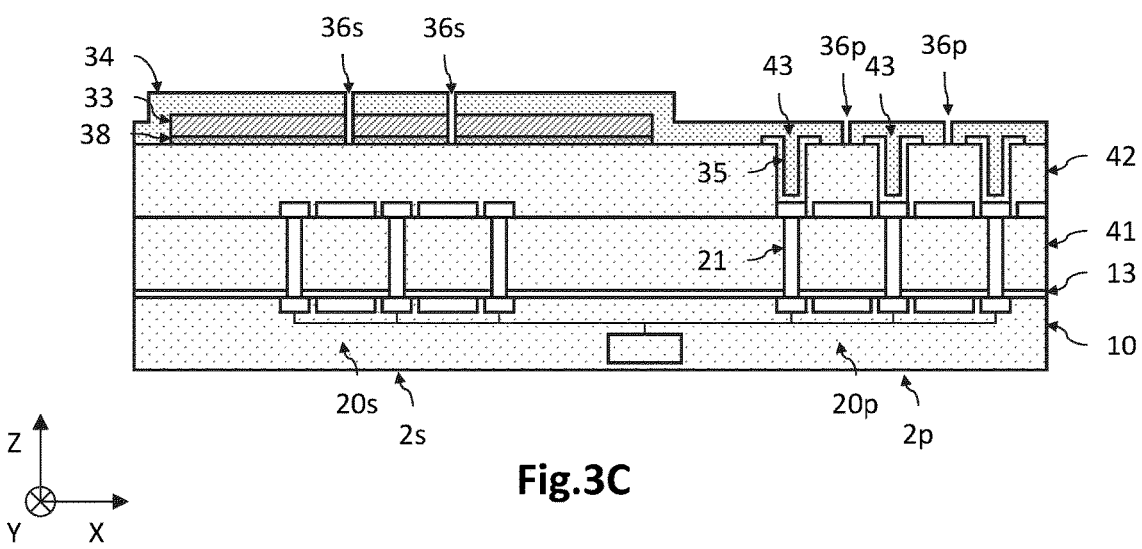

With reference to FIG. 3C, the thin encapsulation layer 34 is subsequently deposited, so as to cover here the opaque stack and to extend above the detection array 2p. It fills the notches 43 and forms the reinforcement pillars 35. The first and second vents 36p, 36s are also produced.

With reference to FIG. 3D, the chemical etching is carried out so as to partially remove the mineral sacrificial layers 41, 42, and thus form the main 3p and secondary cavities 3s delimited by the mineral peripheral walls 31s, 31p (see FIG. 3F). The opaque upper wall 32s is then suspended above the compensation array 2s and rests on the mineral peripheral wall 31s. The thin protective layer 38 has a portion of its lower face that has been freed. However, it has protected the thin opaque layer 33 in relation to the etching agent used. The structural integrity of the thin opaque layer 33 has therefore been preserved, and therefore also its optical properties and its gettering effect.

With reference to FIG. 3E, a second chemical etching is carried out, to which the thin protective layer 38 is sensitive, for example a dry chemical etching, to remove the portion having its free lower surface. A lateral over-etching may also take place. Thus, a portion of the lower face of the thin opaque layer 33 is freed. The sealing layer is subsequently deposited to close off the vents 36p, 36s. The chemisorption of the material with gettering effect of the thin opaque layer 33 is subsequently activated by subjecting the detection device 1 to a suitable heat treatment, for example in a furnace or an oven.

FIG. 3F is a schematic and partial, top view of the detection device 1 thus obtained. For the gettering material of the thin opaque layer 33 to be able to ensure the gas pumping of the main and secondary cavities, a communication chamber 6 is produced, which ensures the gas communication between the two cavities. It is delimited laterally by a non-etched portion of the mineral sacrificial layers and is delimited here vertically by the opaque upper wall 32s. In order to obtain this communication chamber 6 during the step of partially removing the mineral sacrificial layers, vents 36s, 36p were produced beforehand through the opaque upper wall 32s, and disposed above the area intended to form the communication chamber 6. The vents 36s here pass through the layers 34, 33 and 38, whereas the vents 36p only pass through the layer 34.

FIGS. 4A to 4D illustrate, schematically and partially, various steps of a manufacturing method according to another embodiment. It differs from those described above essentially in that the main encapsulation structure 30p does not comprise a thin encapsulation layer 34, but an attached rigid cover 9, that is to say a cover produced beforehand then attached and assembled to the reading substrate 10 so as to encapsulate the detection array 2p (the cover 9 here also encapsulates the compensation array 2s). The main encapsulation structure 30p here is similar or identical to that described in the document EP3239670A1.

The cover 9 may be made from a silicon substrate, and structured so as to comprise a peripheral wall intended to be assembled to the reading substrate 10. The peripheral wall is fastened to the reading substrate 10 via a vacuum seal 8, the latter preferably being in contact with a bonding portion of a metal layer. The vacuum seal 8 may be obtained by remelting a meltable metal or by forming an intermetallic alloy.

The method then comprises a step of producing (FIG. 4A) the detection array 2p and the compensation array on the reading substrate 10, as described above. The opaque upper wall 32s here is formed of a stack comprising the thin opaque layer 33 and a thin reinforcement layer 39. The thin reinforcement layer 39 may form a quarter-wave blade, as described above. Here, it contributes to reinforcing the mechanical strength of the opaque upper wall 32s. The opaque upper wall 32s extends in the secondary area, and optionally around the main area, but does not extend above the detection array 2p. In this example, it is intended to extend beyond the mineral peripheral wall 31s, so as to form an overhanging portion (a portion that protrudes laterally beyond the mineral peripheral wall 31s in a direction opposite the secondary cavity 3s).

The partial removal of the mineral sacrificial layers 41, 42 is subsequently carried out (FIG. 4B) by chemical etching. Thus, the detection array 2p, as well as the compensation array 2s, which is surrounded by the mineral peripheral wall 31s, is released. The opaque upper wall 32s then has the overhanging portion located between the compensation array 2s and the detection array 2p. In this example, this overhanging portion is formed of two thin layers 33, 39, but alternatively, it may only be formed of the thin reinforcement layer 39 (the thin opaque layer 33 stopping above the mineral peripheral wall 31s). The selection between these two configurations may depend on the difference in mechanical stresses between these thin layers 33, 39. Thus, a configuration where the overhanging portion would only be formed of the thin reinforcement layer 39 is advantageous to prevent an imbalance of the mechanical stresses between the two layers 33, 39 and correct a possible deflection of the overhanging portion. It should be noted that it appears that a chemical attack in an acid medium of the mineral sacrificial layers 41, 42 in a confined environment (i.e. below the opaque upper wall 32s) has a lateral etching speed (in the XY plane) faster than the vertical etching speed (along the Z axis). In addition, the release of the detection array 2p and the formation of the secondary cavity 3s (etching of layers 41 and 42 and evacuation through vents 36s) is obtained over time.

Figure 4C:
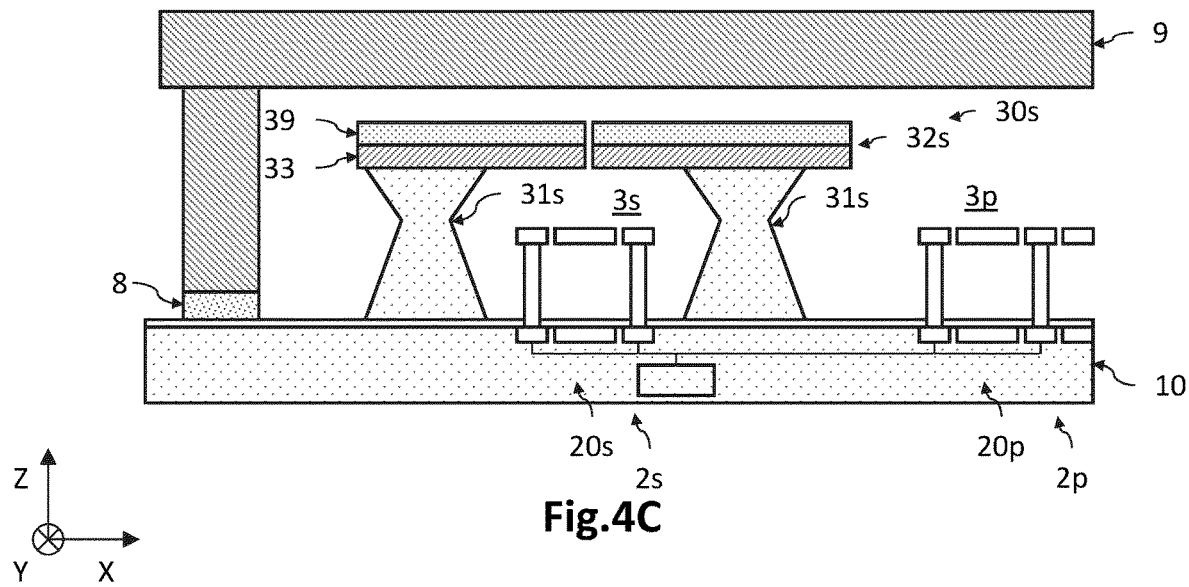

A line of a sealing material intended to form the vacuum seal 8, which rests on the reading substrate 10 and surrounds the detection array 2p, is subsequently deposited (FIG. 4C). Here, it also surrounds the compensation array 2s. This line of sealing material was deposited before the partial removal of the mineral sacrificial layers 41, 42, for example in a peripheral trench passing through the mineral sacrificial layers and surrounding the detection array 2p. The cover 9 is subsequently attached on the vacuum seal 8 and the reading substrate 10 is assembled. It should be noted that the cover 9 ensures the closing off of the vents 36s. Thus, the cavity 3s is contained in the cavity 3p.

Figure 4D:
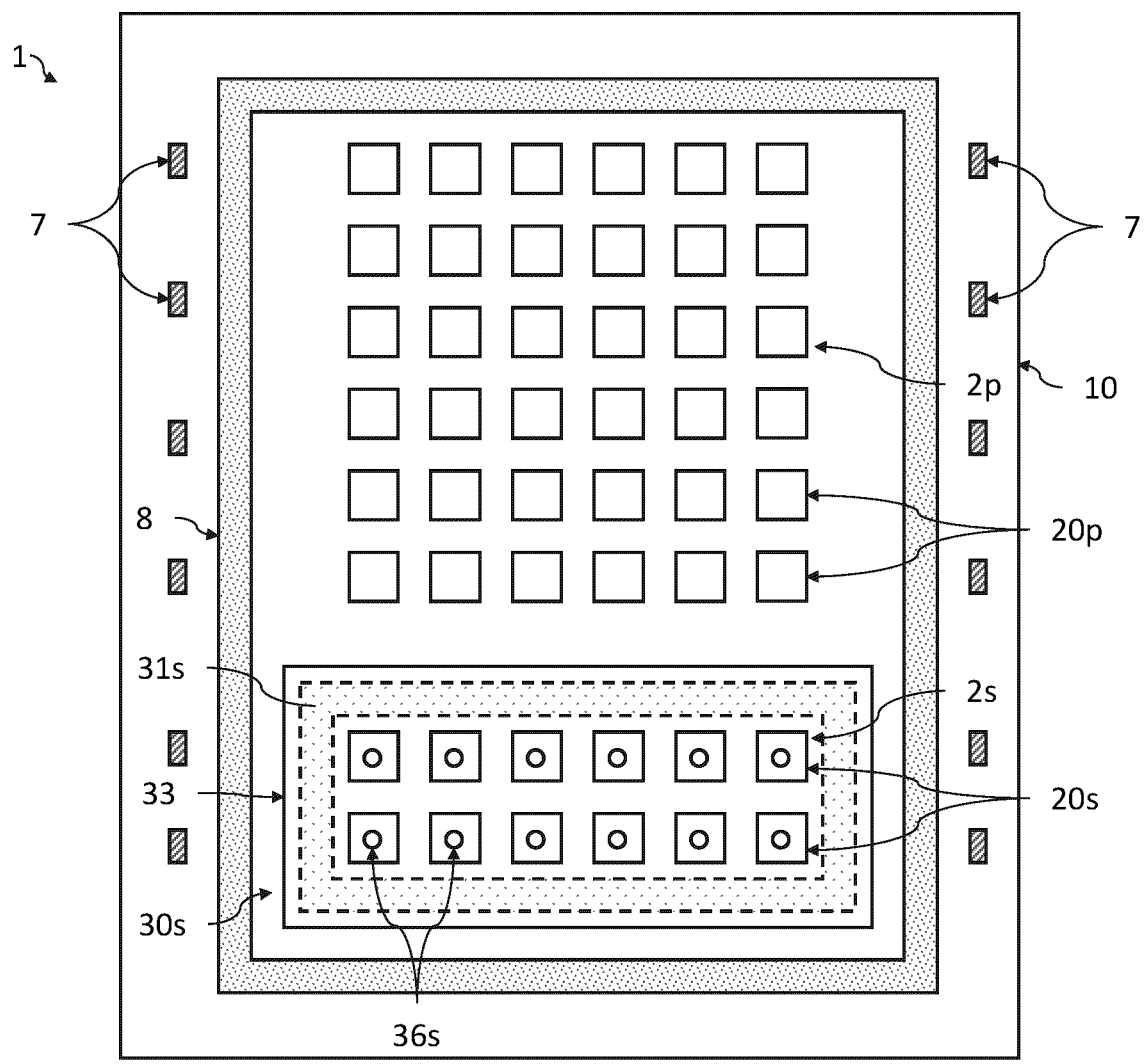
Figure 4D:
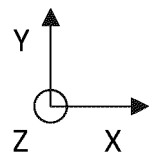

FIG. 4D is a schematic and partial, top view of the detection device 1 obtained after the step of producing the vacuum seal 8 and before attaching the cover 9. The mineral peripheral wall 31s of the secondary encapsulation structure 30s here has a width less than its length, and extends longitudinally around the compensation array 2s. The thin opaque layer 33 extends above the compensation array 2s, rests on the mineral peripheral wall 31s, and here has an overhanging portion. The remainder of the surface of the reading substrate 10 thus is not covered by a non-etched portion of the mineral sacrificial layers.

Particular embodiments have just been described. Various variants and modifications are possible while remaining within the scope of the invention.

Thus, the main encapsulation structure 30p may, alternatively, be similar or identical to that described in the document EP3399290A1. Such an encapsulation structure comprises a peripheral wall that surrounds the detection array 2p, and that is produced by a thin layer deposition technique. An upper wall may be attached and assembled on the peripheral wall by means of a temporary handle.

What is claimed is:

1. A method for manufacturing a device for detecting electromagnetic radiation, comprising the following steps of:
producing a detection array formed of thermal detectors intended to detect the electromagnetic radiation, and of at least one compensation array formed of thermal detectors intended not to detect the electromagnetic radiation, on and through a first sacrificial layer resting on a reading substrate,
the thermal detectors of the compensation array being configurated to detect the electromagnetic radiation and structurally identical to the thermal detectors of the detection array;
producing a second sacrificial layer covering the thermal detectors and the first sacrificial layer;
producing a secondary encapsulation structure delimiting a secondary cavity wherein the compensation array is located, and comprising a peripheral wall as well as an opaque upper wall resting on the peripheral wall and formed of at least one thin opaque layer;
wherein:
the first and second sacrificial layers are made of a mineral material;
the step of producing the secondary encapsulation structure comprises the following steps of:
producing the thin opaque layer so that it extends in a continuously planar manner only along an upper surface of the second mineral sacrificial layer;
producing, in the thin opaque layer, vents disposed facing the compensation array;
partially removing the first and second mineral sacrificial layers through the vents, by chemical etching, so as to release the detection array and the compensation array, and to obtain the peripheral wall then formed of a non-etched portion of the mineral sacrificial layers and surrounding the compensation array, the thin opaque layer then being suspended above the compensation array and resting on the peripheral wall.

2. The manufacturing method according to claim 1, wherein the first and second sacrificial layers are made of the same mineral material based on a silicon nitride or oxide.

3. The manufacturing method according to claim 1, wherein the thermal detectors of the detection array like the thermal detectors of the compensation array each comprise an absorbent membrane capable of absorbing the electromagnetic radiation to be detected and comprising a thermometric transducer, suspended above the reading substrate by anchoring pillars and retention arms and thermal insulation.

4. The manufacturing method according to claim 3, wherein the thermal detectors of the detection array and/or the thermal detectors of the compensation array each comprise a reflective layer, which rests on the reading substrate, below each absorbent membrane.

5. The manufacturing method according to claim 1, wherein the opaque upper wall comprises an interferential stack absorbent to the electromagnetic radiation to be detected.

6. The manufacturing method according to claim 1, wherein the opaque upper wall further comprises at least one thin reinforcement layer covering the thin opaque layer, and has an edge protruding in relation to the peripheral wall in a plane parallel to the reading substrate, the protruding edge comprising the thin opaque layer and/or the thin reinforcement layer.

7. The manufacturing method according to claim 1, wherein the secondary cavity has a length and a width in a plane parallel to the reading substrate, the width being less than or equal to 200 µm, the opaque upper wall not comprising reinforcement pillars, made in one piece and of the same material with a thin layer of the opaque upper wall, located in the secondary cavity and coming to rest on the reading substrate.

8. The manufacturing method according to claim 1, wherein the mineral sacrificial layers are made of a material absorbent to the electromagnetic radiation to be detected.

9. The manufacturing method according to claim 1, wherein the thin opaque layer is made of a material with gettering effect.

10. The manufacturing method according to claim 9, comprising the following steps of:
before the step of partial removal, producing the opaque upper wall formed of a stack comprising a thin protective layer made of inert amorphous carbon with an etching agent used during the step of partial removal and located in contact with the second mineral sacrificial layer, the thin opaque layer extending only over and in contact with the thin protective layer;
so that, during the step of partial removal, the thin opaque layer is protected by the thin protective layer,
after the step of partial removal, removing at least one portion of the thin protective layer by chemical etching, so as to free an inner face of the thin opaque layer.

11. The manufacturing method according to claim 1, comprising a step of producing a main encapsulation structure delimiting a main cavity wherein the detection array is located, and comprising a main upper wall comprising a thin encapsulation layer resting on a main peripheral wall, by the following steps of:
depositing the thin encapsulation layer on the second mineral sacrificial layer, extending above the detection array and the compensation array;
producing, in the thin encapsulation layer, main vents disposed facing the detection array;
the partial removal of the first and second mineral sacrificial layers being carried out so as to form the main peripheral wall then formed of a non-etched portion of the mineral sacrificial layers and surrounding the detection array, the thin encapsulation layer then being suspended above the detection array and resting on the main peripheral wall.

12. The manufacturing method according to claim 9, comprising a step of producing a main encapsulation structure delimiting a main cavity wherein the detection array is located, and comprising a main upper wall comprising a thin encapsulation layer resting on a main peripheral wall, by the following steps of:
depositing the thin encapsulation layer on the second mineral sacrificial layer, extending above the detection array and the compensation array;

producing, in the thin encapsulation layer, main vents disposed facing the detection array;

the partial removal of the first and second mineral sacrificial layers being carried out so as to form the main peripheral wall then formed of a non-etched portion of the mineral sacrificial layers and surrounding the detection array, the thin encapsulation layer then being suspended above the detection array and resting on the main peripheral wall;

and further comprising a step of producing a communication chamber connecting the secondary cavity and the main cavity, the communication chamber being delimited laterally by a non-etched portion of the first and second mineral sacrificial layers.

13. The manufacturing method according to claim 11, comprising a step of producing reinforcement pillars of the thin encapsulation layer, resting on the reading substrate, preferably by means of anchoring pillars of the thermal detectors of the detection array.

14. The manufacturing method according to claim 1, wherein the chemical etching is carried out with hydrofluoric acid in the vapour phase, and the first and second mineral sacrificial layers are made of a mineral material based on silicon oxide.

15. A device for detecting electromagnetic radiation, comprising:
   a reading substrate;
   a detection array formed of thermal detectors intended to detect the electromagnetic radiation;
   at least one compensation array formed of thermal detectors intended not to detect the electromagnetic radiation, configured to detect the electromagnetic radiation, and structurally identical to the thermal detectors of the detection array;
   a so-called-secondary encapsulation structure delimiting a secondary cavity wherein the compensation array is located, and comprising a peripheral wall as well as an opaque upper wall resting on the peripheral wall and formed of at least one thin opaque layer;
   wherein:
      the thin opaque layer extends in a continuously planar manner;
      the peripheral wall is made of a mineral material.

* * * * *